Figure 1:
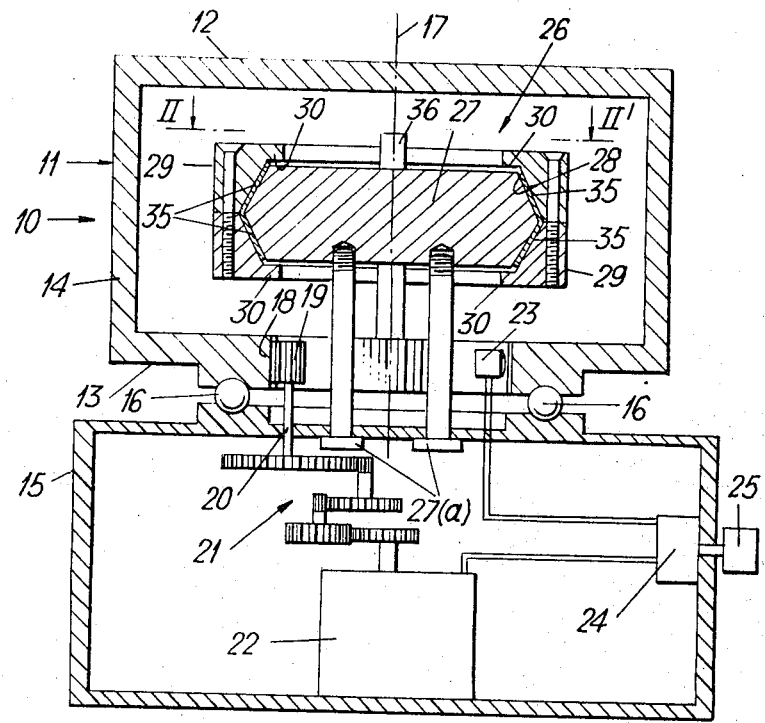

United States Patent [19]
Manners-Smith et al.

[11] 3,860,096
[45] Jan. 14, 1975

[54] FRICTION BRAKING APPARATUS

[75] Inventors: John Manners-Smith, Manchester; Christopher Garth Thompson, Nantwich; Peter Tinning, Manchester, all of England

[73] Assignee: Ferranti Limited, Hollinwood, Lancashire, England

[22] Filed: Aug. 28, 1973

[21] Appl. No.: 392,277

[30] Foreign Application Priority Data
Aug. 30, 1972 Great Britain .................... 40166/72

[52] U.S. Cl. .................. 188/134, 188/75, 188/83, 188/166, 192/8 R, 192/79
[51] Int. Cl. ............................................... B60t 7/12
[58] Field of Search ......... 188/75, 83, 84, 186, 166, 188/167, 134; 192/79, 8 R

[56] References Cited
UNITED STATES PATENTS

| | | | |
|---|---|---|---|
| 1,170,216 | 2/1916 | Blanch | 192/8 R |
| 1,617,745 | 2/1927 | Cousinard | 192/8 R |
| 2,389,929 | 11/1945 | Paulsen | 188/83 |
| 2,777,337 | 1/1957 | Hultin | 188/166 X |
| 2,903,099 | 9/1959 | Nelson | 188/75 |
| 3,134,462 | 5/1964 | Messinger | 188/129 |

Primary Examiner—George E. A. Halvosa
Attorney, Agent, or Firm—Cameron, Kerkam, Sutton, Stowell & Stowell

[57] ABSTRACT

Friction braking apparatus comprises a circular plate having a central region of greater diameter than its faces to form a V-shaped peripheral wall and this is surrounded by two or more "shoes," disposed symmetrically around the peripheral wall and biased towards the centre of the plate by spring means between adjacent shoes. The shoes have V-channels corresponding to the peripheral wall and a layer of polytetrafluoroethylene is sandwiched between them. In operation the plate is fixed to one relatively rotatable part of a machine and a plurality of pegs are fixed to the other. The pegs extend between adjacent shoes and push against them, causing both a smooth reduction in the contact pressure between the shoes and the wall against the bias springs and the rotation of the shoes around the periphery of the plate.

8 Claims, 2 Drawing Figures

PATENTED JAN 14 1975

3,860,096

FRICTION BRAKING APPARATUS

This invention relates to friction braking apparatus.

In many instances it is desired to move and stop relatively movable members by using a constant driving force and/or to accurately position the members relative to each other. These are usually difficult to perform because of greatly differing values between the coefficients of static friction and dynamic friction between the members. The actual value of static friction, hereinafter referred to as stiction, is usually greater than the value of the dynamic friction, so that to produce motion a larger force is required than to maintain motion and such motion begins with a jump as stiction is overcome and before the applied force can be reduced.

Special low friction materials are available which reduce the level of both types of friction but in many cases it is desired to remove stiction while retaining dynamic friction. Positioning relatively movable members is made easier if dynamic friction exists between them such that the application of a driving force slightly in excess of the frictional force may be used to produce small controlled amounts of relative movement. However, it has previously been impossible to provide such dynamic friction without introducing the undesirable effects of stiction.

It is an object of the present invention to provide friction braking apparatus exhibiting little stiction.

According to the present invention friction braking apparatus comprises two relatively rotatable members, a first of said members comprising a circular plate having its central region of greater diameter than its faces to provide a V-shaped peripheral wall, the second of said members comprising two or more component parts co-operating with the peripheral wall for at least a portion of the circumference, a layer of low friction high density plastics material sandwiched between each component part of the second member and the peripheral wall, bias means to urge each portion towards the peripheral wall to produce a contact pressure therebetween, and drive means operable to reduce the said contact pressure and then to rotate the second member with respect to the first member.

Figure 2:
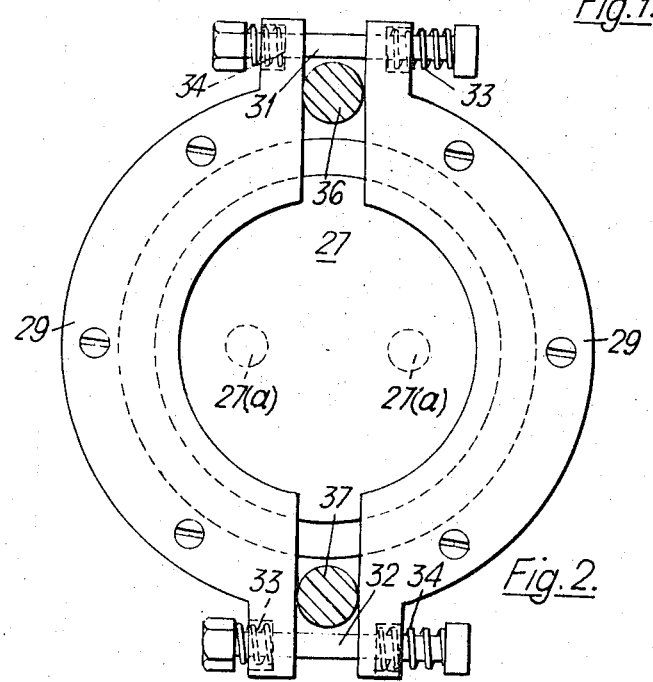

The invention will now be described by way of example with reference to the accompanying drawings, in which:

FIG. 1 is a sectional elevation through a machine having a rotatable worktable incorporating friction braking apparatus, and FIG. 2 is a plan view of the friction braking apparatus taken along the line II — II' in FIG. 1.

Referring to FIG. 1 there is shown a machine 10 having a rotatable worktable 11. The worktable consists of a hollow cylindrical member having circular faces 12 and 13 and peripheral wall 14. The centre portion of the face 13 is removed and the remaining annular portion is supported on the bed 15 of the machine by a bearing 16 so that the cylindrical worktable can be rotated about its longitudinal axis 17. The inner annular wall 18 of the face 13 is provided with gear teeth which engage a cog 19 on a shaft 20. The shaft 20 extends into the bed of the machine where, by way of further gearing 21 it engages the drive shaft of a motor 22. Thus operation of the motor 22 causes rotation of the table 11. A pick-off 23 adjacent a part of the worktable provides position indicating signals for a comparator 24 in which they are compared with demand signals derived from an external control 25. The resultant signal is used to control the motor 22.

Contained within the worktable 11 is friction braking apparatus 26 according to the present invention and shown also in FIG. 2. This comprises a first member or circular plate 27 of bronze or mild steel supported co-axially with the worktable from the bed of the machine by pillars 27(a). The peripheral wall 28 of the plate 27 is ground to a V-shape with the diameter of the plate being greater at the centre region than at each face. Surrounding the peripheral wall 28 is a second member comprising two component parts, or shoes, 29. Each shoe has V-shaped inner wall which co-operates with the wall 28. Each of the shoes is constructed in two identical parts bonded together and each has a lip portion 30 extending partly over the circular face of the plate such that the shoes are only able to move radially and circumferentially with respect to the plate. The shoes are connected to each other by way of bolts 31 and 32 and are urged into contact with the wall of the plate by springs 33 and 34 acting between the bolts and the shoes so as to produce a contact pressure between the shoes and the wall.

A tape of low friction high density plastics material 35, such as P.T.F.E. or high density polyethylene, is attached to each of the V-shaped walls of the shoes 29 such that the tape is sandwiched between the shoes and the plate 27.

Thus contact between the metal of the plate and the metal of the shoes does not impede rotational movement of the shoes. The frictional resistance to such motion is due to the pressure between the two V-surfaces and is analogous to large frictional coupling obtainable from two superposed conical surfaces. The resistance to motion is therefore dependent on the pressure exerted between the shoes and the plate, which pressure is controlled by the compression of the springs 33 and 34.

Two pegs 36 and 37 extend upwards from the face 13 of the worktable and engage the friction apparatus in the space between the shoes 29 and adjacent the bolts 31 and 32 respectively.

In operation rotation of the worktable by the motor 22 causes rotation of the shoes by means of the pegs 36 and 37. Although the effect of stiction between the moving surfaces is reduced to negligible proportions by the plastics tape 35, if the force applied has to be raised above the predetermined level then the pegs act on the shoes and reduce the contact pressure between the shoes and the plate against the action of the bias spring 33. Thus the impulse of a sudden movement of the pegs is absorbed by the springs 33 and the shoes begin to move smoothly from rest, a constant retarding force being applied to the motion throughout.

Thus the worktable 11 may be moved over any short distance against a constant retarding force and without the type of motion associated with stiction.

The friction braking apparatus may also be applied as a stictionless load in dynamometers testing the power develoeped by motors and engines. For instance, it may be employed in simulating the behaviour of a motor vehicle against air resistance of various types of vehicle bodies while still in the chassis state, by employing the appropriate loading to the bias springs 33 and 34.

A further use for the friction braking apparatus is in hand-operated mock-ups of systems where it may be used to simulate the inertia associated with the weight of the real system.

The apparatus has been described in relation to a single V-Shaped peripheral wall but the wall may comprise a plurality of V-shapes arrayed side-by-side with the corresponding grooved shoes.

What we claim is:

1. Friction braking apparatus comprising two relatively rotatable members, a first of said members comprising a circular plate having a V-shaped peripheral wall, the second of said members comprising two or more component parts each having a V-shaped surface conforming to and co-operating with the peripheral wall for at least a portion of the circumference thereof, a layer of low friction high density plastics material sandwiched between each component part and the peripheral wall, bias means urging each component part towards the peripheral wall to produce a contact pressure therebetween, and drive means operable to rotate the second member with respect to the first member by first reducing the said contact pressure until static friction is overcome and then reapplying the contact pressure throughout continued rotation of the second member.

2. Friction braking apparatus as claimed in claim 1 in which the component parts of the second member are disposed symmetrically about the periphery of the first member.

3. Friction braking apparatus as claimed in claim 2 in which there are two component parts of the second member.

4. Friction braking apparatus as claimed in claim 1 in which the bias means comprises a plurality of spring members each operable to urge adjacent ends of adjacent component parts towards each other.

5. Friction braking apparatus as claimed in claim 1 in which the low friction high density plastics material is polytetrafluoroethylene.

6. Friction braking apparatus as claimed in claim 1 in which the low friction high density plastics material is high density polyethylene.

7. Friction braking apparatus as claimed in claim 1 in which the drive means comprises a plurality of pegs extending parallel to the longitudinal axis of the first member and between adjacent component parts of the second member, each peg being operable to push a component part out of contact with the peripheral wall against the bias means and to push said component part around the periphery of the plate.

8. Friction braking apparatus comprising two relatively rotatable members, a first of said members comprising a circular plate having a V-shaped peripheral wall, the second of said members comprising two or more component parts disposed symmetrically about the periphery of the first member, each of said component parts having a V-shaped surface conforming to and co-operating with the peripheral wall for at least a portion of the circumference thereof, a layer of low friction high density plastics material sandwiched between each component part and the peripheral wall, bias means urging each component part towards the peripheral wall to produce a contact pressure therebetween, said bias means comprising a plurality of spring members each operable to urge adjacent ends of adjacent component parts towards each other, and drive means operable to rotate the second member with respect to the first member by first reducing the said contact pressure until static friction is overcome and then reapplying the contact pressure throughout continued rotation of the second member, said drive means comprising a plurality of pegs extending parallel to the longitudinal axis of the first member and between adjacent component parts of the second member, each peg being operable to push a component part out of contact with the peripheral wall against the bias means and thereby reduce the said contact pressure until static friction is overcome and to then push said component part around the periphery of the plate while the contact pressure is reapplied.

* * * * *